US011016901B2

(12) United States Patent
Patel et al.

(10) Patent No.: US 11,016,901 B2
(45) Date of Patent: May 25, 2021

(54) STORAGE SYSTEM DE-THROTTLING TO FACILITATE EMERGENCY CACHE DESTAGE

(71) Applicant: International Business Machines Corporation, Armonk, NY (US)

(72) Inventors: Kushal Patel, Pune (IN); Sarvesh Patel, Pune (IN); Errol J. Calder, Vail, AZ (US); David R. Blea, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 16/215,177

(22) Filed: Dec. 10, 2018

(65) Prior Publication Data

US 2020/0183847 A1 Jun. 11, 2020

(51) Int. Cl.
*G06F 12/00* (2006.01)
*G06F 12/0868* (2016.01)
*G06F 12/0891* (2016.01)
*G06F 1/30* (2006.01)

(52) U.S. Cl.
CPC ............ *G06F 12/0868* (2013.01); *G06F 1/30* (2013.01); *G06F 12/0891* (2013.01)

(58) Field of Classification Search
None
See application file for complete search history.

(56) References Cited

U.S. PATENT DOCUMENTS

| 7,100,080 | B2 | 8/2006 | Howe |
| 7,370,163 | B2 | 5/2008 | Yang et al. |
| 7,870,338 | B2 | 1/2011 | Iida et al. |
| 8,630,054 | B2 | 1/2014 | Bennett et al. |
| 8,990,502 | B2 | 3/2015 | Koltsidas et al. |
| 9,280,200 | B1 | 3/2016 | Glassburn et al. |
| 2005/0071550 | A1 | 3/2005 | Lowe et al. |
| 2006/0212651 | A1 | 9/2006 | Ashmore |
| 2008/0189484 | A1* | 8/2008 | Iida ..................... G06F 11/1441 711/114 |
| 2012/0089796 | A1* | 4/2012 | Fukazawa ........... G06F 11/1441 711/162 |
| 2019/0042146 | A1* | 2/2019 | Wysoczanski ........ G06F 3/0656 |

FOREIGN PATENT DOCUMENTS

WO WO2007018779 A1 2/2007

* cited by examiner

*Primary Examiner* — Daniel D Tsui
(74) *Attorney, Agent, or Firm* — Nelson and Nelson; Daniel P. Nelson

(57) ABSTRACT

A method for destaging data from cache is disclosed. In one embodiment, such a method includes maintaining, in cache, modified data to be destaged to persistent storage drives. The method further detects an emergency situation wherein the modified data needs to be promptly destaged to the persistent storage drives. In response to the emergency situation, the method automatically disables artificially-imposed throughput limits associated with the persistent storage drives. The method then destages the modified data to the persistent storage drives without restriction from the artificially-imposed throughput limits. A corresponding system and computer program product are also disclosed.

20 Claims, 6 Drawing Sheets

STORAGE SYSTEM DE-THROTTLING TO FACILITATE EMERGENCY CACHE DESTAGE

BACKGROUND

Field of the Invention

This invention relates to systems and methods for destaging data from the write cache of enterprise storage systems.

Background of the Invention

In an enterprise storage system such as the IBM DS8000™ enterprise storage system, a pair of servers may be used to access data in one or more storage drives (e.g., hard-disk drives and/or solid-state drives). During normal operation (when both servers are operational), the servers may manage I/O to different logical subsystems (LASS) within the enterprise storage system. For example, in certain configurations, a first server may handle I/O to even LASS, while a second server may handle I/O to odd LASS. These servers may provide redundancy and ensure that data is always available to connected hosts. When one server fails, the other server may pick up the I/O load of the failed server to ensure that I/O is able to continue between the hosts and the storage drives. This process may be referred to as a "failover."

Each server in the storage system may include one or more processors and memory. The memory may include volatile memory (e.g., RAM) as well as non-volatile memory (e.g., ROM, EPROM, EEPROM, flash memory, local hard drives, local solid state drives, etc.). The memory may include a cache, such as a DRAM cache. Whenever a host (e.g., an open system or mainframe server) performs a read operation, the server that performs the read may fetch data from the storage drives and save it in its cache in the event it is needed again. If the data is requested again by a host, the server may fetch the data from the cache instead of fetching it from the storage drives, saving both time and resources. Similarly, when a host performs a write, the server that receives the write request may store the modified data in its cache, and destage the modified data to the storage drives at a later time. When modified data is stored in cache, the modified data may also be stored in battery-backed cache (also referred to as "non-volatile storage," or NVS) of the opposite server so that the modified data can be recovered by the opposite server in the event the first server fails.

When a storage system such as the IBM DS8000™ enterprise storage system experiences a power outage, the modified data in the battery-backed cache may be quickly copied under battery power to more persistent storage (e.g., a local disk drive, solid state drive, and/or flash drive). The energy in the backup battery needs to be sufficient to complete the copy process. If a battery is degraded, a copy process is not initiated quickly enough after the storage system goes on battery power, and/or the battery-backed cache contains too much data, the battery may not have sufficient energy to complete the copy process. In such cases, data loss may result.

In view of the foregoing, what are needed are systems and methods to ensure that modified data in battery-backed cache is preserved in the event of a power outage. Further needed are systems and methods to ensure that, in the event of a power outage, data is promptly and reliably copied from the battery-backed cache to more persistent storage.

SUMMARY

The invention has been developed in response to the present state of the art and, in particular, in response to the problems and needs in the art that have not yet been fully solved by currently available systems and methods. Accordingly, systems and methods have been developed to more effectively destage data from cache. The features and advantages of the invention will become more fully apparent from the following description and appended claims, or may be learned by practice of the invention as set forth hereinafter.

Consistent with the foregoing, a method for destaging data from cache is disclosed. In one embodiment, such a method includes maintaining, in cache, modified data to be destaged to persistent storage drives. The method further detects an emergency situation wherein the modified data needs to be promptly destaged to the persistent storage drives. In response to the emergency situation, the method automatically disables artificially-imposed throughput limits associated with the persistent storage drives. The method then destages the modified data to the persistent storage drives without restriction from the artificially-imposed throughput limits.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
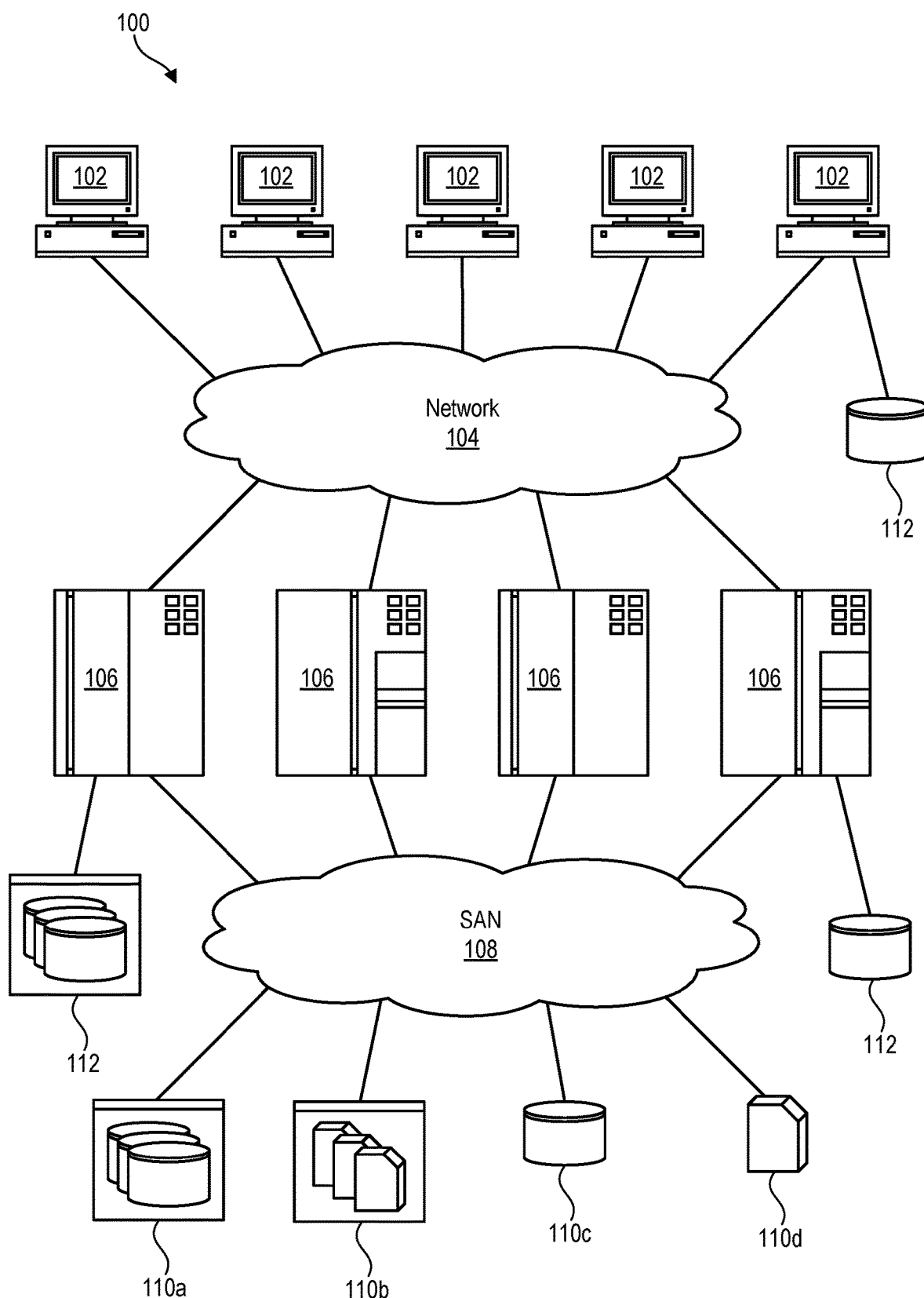
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
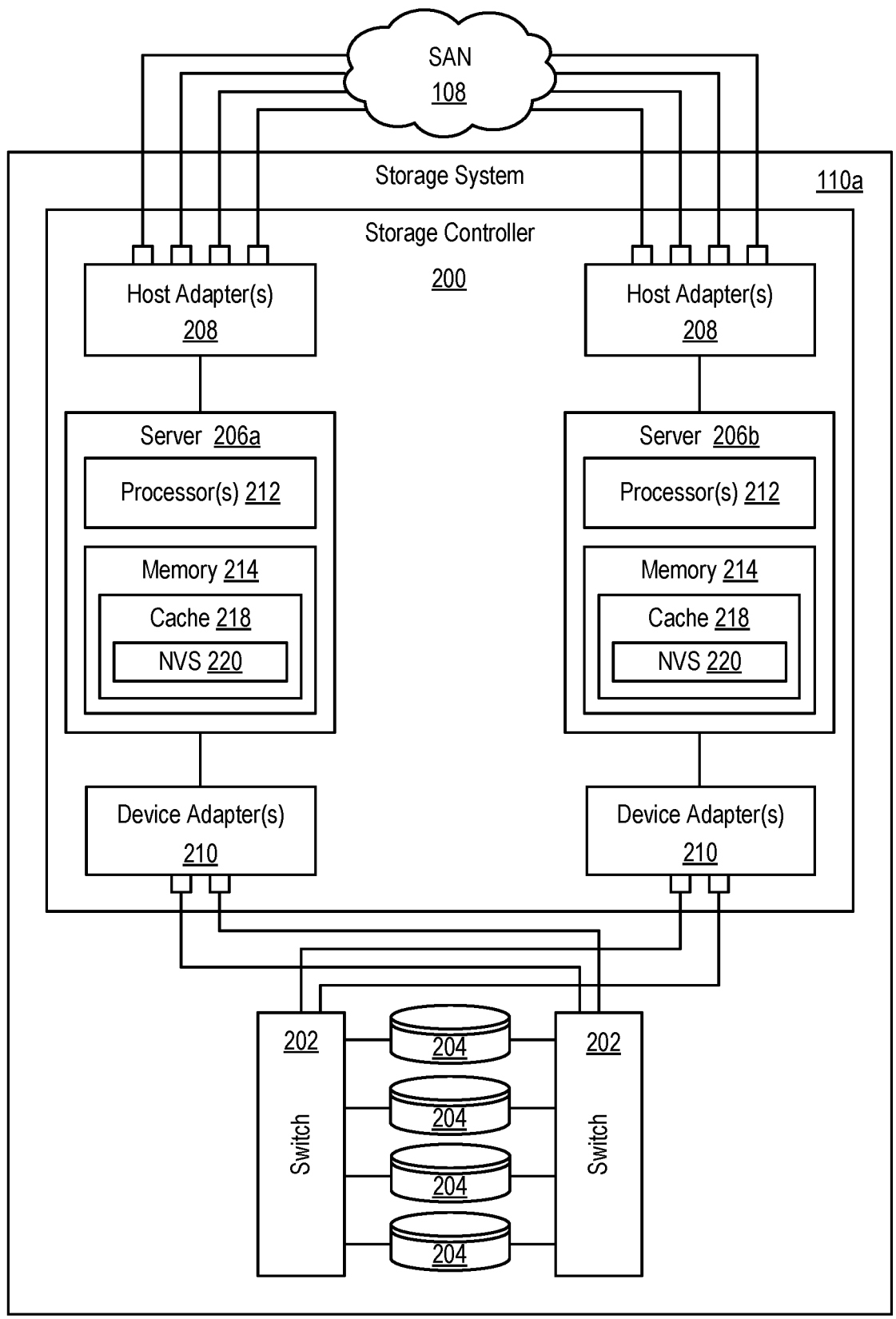
FIG. 2 is a high-level block diagram showing one example of a storage system for use in the network environment of FIG. 1.

Referring to FIG. 2, one embodiment of a storage system 110a containing an array of storage drives 204 (e.g., hard-disk drives and/or solid-state drives) is illustrated. The internal components of the storage system 110a are shown since the systems and methods disclosed herein may, in certain embodiments, be implemented within such a storage system 110a, although the systems and methods may also be applicable to other storage systems. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LASS) within the enterprise storage system 110a. For example, in certain configurations, a first server 206a may handle I/O to even LASS, while a second server 206b may handle I/O to odd LASS. These servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed cache 218 in the opposite server 206.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
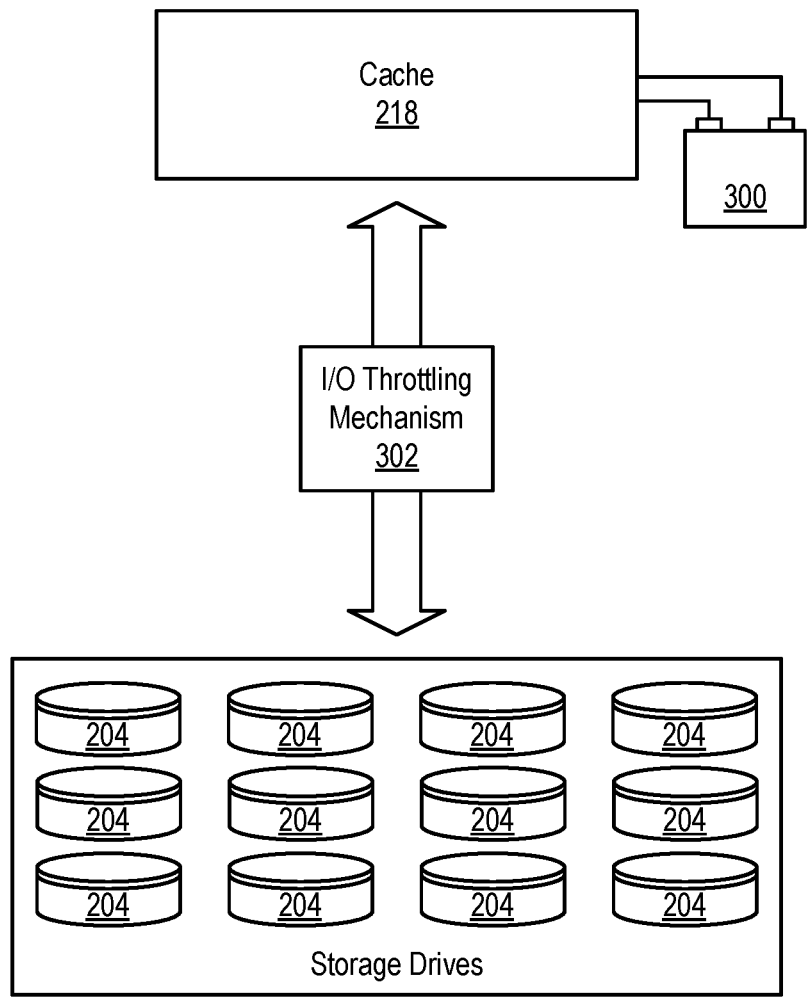
FIG. 3 is a high-level block diagram showing one embodiment of a throttling mechanism to limit I/O throughput to storage drives of a storage system.

Referring to FIG. 3, when a storage system 110a such as that illustrated in FIG. 2 experiences a power outage, the modified data in the cache 218 may be quickly copied (also referred to as performing a "fire hose dump") under battery power to more persistent storage (e.g., a local disk drive, solid state drive, flash drive, etc.). Ideally, this copy process will complete before energy in the battery 300 is depleted. It follows that the energy in the battery 300 needs to be sufficient to complete the copy process. If a battery 300 is degraded or the copy process is not initiated quickly enough after the storage system 110 is operated on battery power, the battery 300 may not have sufficient energy to complete the copy process. In such cases, data loss may result. In such cases, modified data in the cache 218 may be all or partially lost.

In addition to time and energy requirements needed to destage data from cache 218 to the persistent storage drives 204, other mechanisms may impede the prompt destaging of data. For example, in certain cases, I/O throttling mechanisms 302 may limit data throughput between the cache 218 and the persistent storage drives 204. Under normal (i.e., non-emergency) operating conditions, these throttling mechanisms 302 may ensure that certain storage drives 204 or logical volumes do not receive excessive I/O to the detriment of other storage drives 204 or logical volumes. Different throttling limits may be established for different storage drives 204 or logical volumes in the storage system 110. Although effective during normal operating conditions, these throttling mechanisms 302 may, in certain cases, impede or slow down the destaging of data from the cache 218 to the persistent storage drives 204 during emergency situations. That is, the I/O throttling mechanisms 302 may impede the flow of data between the cache 218 and the storage drives 204. In a worse case scenario, this may prevent all data from being destaged to persistent storage drives 204 before energy in a battery 300 is depleted, thereby resulting in data loss.

Figure 4:
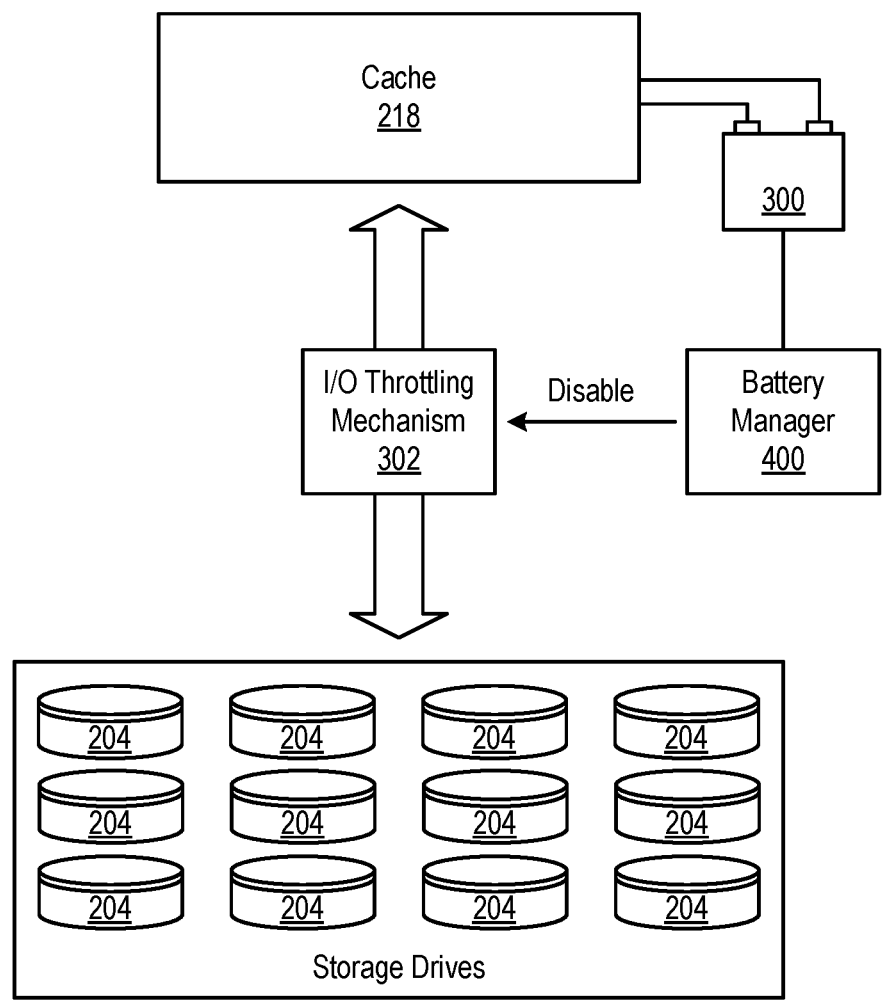
FIG. 4 is a high-level block diagram showing disabling of the throttling mechanism when an emergency situation is detected.

Referring to FIG. 4, in certain embodiments, systems and methods in accordance with the invention may be configured to disable I/O throttling when emergency situations such as power outages or faults are detected. This may enable full throughput capability between a cache 218 and persistent storage drives 204 to be utilized when destaging data. When the emergency situation is remedied, the I/O throttling may be re-enabled, thereby providing desired I/O throttling between the cache 218 and persistent storage drives 204.

Various types of emergency situations may trigger disabling of the I/O throttling mechanism 302. These emergency situations may include, for example, power outages, errors, faults, or other problems on a storage system 110. FIG. 4 shows one scenario where a power outage causes a storage system 110 and associated cache 218 to operate on battery power. A battery manager 400 in communication with a battery 300 detects this condition and triggers disabling of an I/O throttling mechanism 302, which limits I/O throughput between a cache 218 and persistent storage drives 204. Once disabled, data may be destaged from the cache 218 to the persistent storage drives 204 without any artificial limits on I/O throughput.

Figure 5:
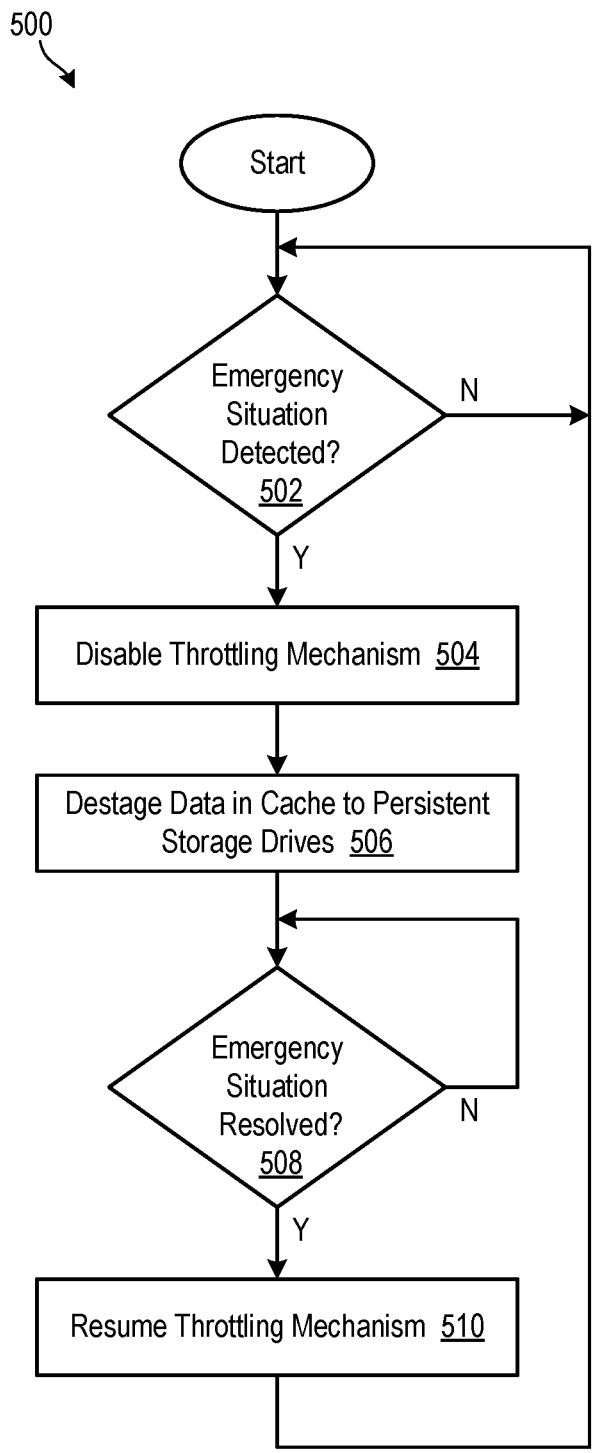
FIG. 5 is a flow diagram showing one embodiment of a method for destaging data from cache when an emergency situation is detected.

FIG. 5 shows one embodiment of a method 500 for destaging data from cache 218 to persistent storage drives 204 when an emergency situation is detected. As shown, the method 500 initially determines 502 whether an emergency situation has occurred that would warrant the immediate destaging of data from the cache 218. If so, the method 500 disables 504 any throttling mechanism 302 used to limit I/O throughput between the cache 218 and the backend storage drives 204. The method 500 then destages 506 data from the cache 218 to the backend storage drives 204 unimpeded.

If, at step 508, the emergency situation is resolved, the method 500 may resume 510 (i.e., re-enable) the throttling mechanism 302. This will once again limit I/O throughput between the cache 218 and the backend storage drives 204. The method 500 may then monitor 502 for the next emergency situation.

Figure 6:
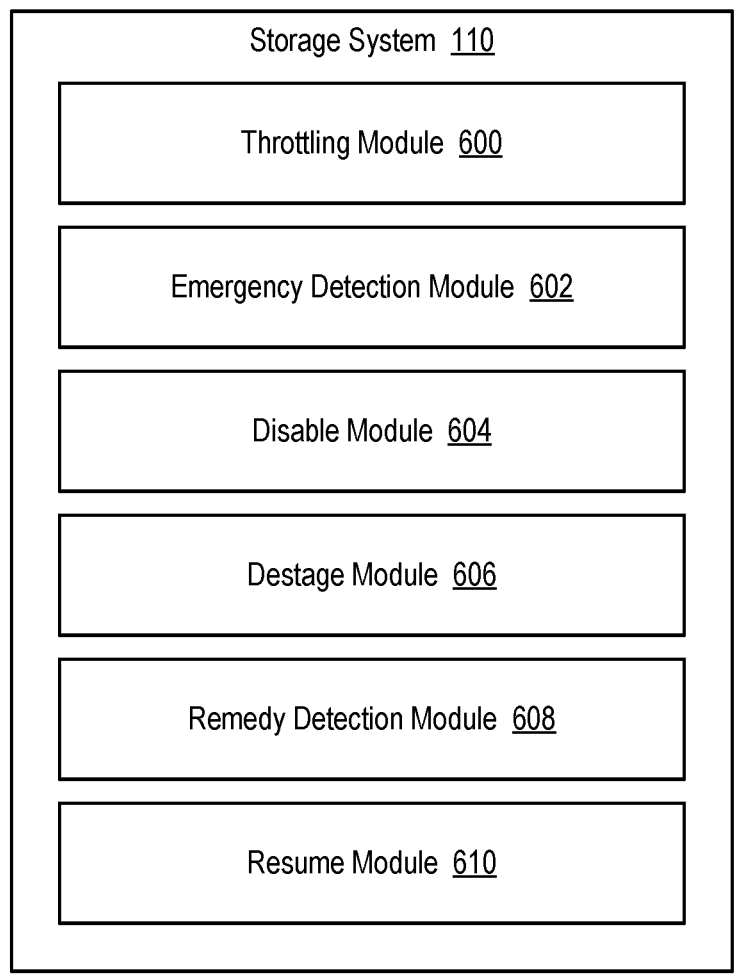
FIG. 6 shows various modules that may be included in or in association with a storage system to provide various features and functions in accordance with the invention.

Referring to FIG. 6, a high-level block diagram is illustrated showing modules that may be used to implement various features and functions of the invention. These modules may be implemented in hardware, software, firmware, or combinations thereof. The modules are presented by way of example and not limitation. More or fewer modules may be provided in different embodiments. For example, the functionality of some modules may be combined into a single or smaller number of modules, or the functionality of a single module may be distributed across several modules. Although the modules are shown within the storage system 110, they are not limited to implementation within a storage system 110. Thus, the location of the modules is provided by way of example and not limitation.

As shown, the modules may include one or more of a throttling module 600, emergency detection module 602, disable module 604, destage module 606, remedy detection module 608, and resume module 610.

The throttling module 600 may be configured to limit I/O throughput between a cache 218 and backend storage drives 204. This throttling may occur with respect to a specific storage drive 204, logical volume, virtual disk, host system 106, or groups thereof. This limit may be imposed in terms of bandwidth, I/O operation per second (TOPS), data access rates, or the like. This will ensure that certain resources are not unduly favored with I/O to the detriment of other resources. This will also ensure that certain resources (e.g., storage drives 204, volumes, etc.) are not starved, and provide better load balancing between resources.

The emergency detection module 602 may be configured to detect emergency situations on the storage system 110. These emergency situations may include, for example, power outages that cause storage systems 110 to run on battery power, impending system shutdowns, or faults or error conditions that may compromise data integrity and would warrant destaging modified data from the cache 218 to the persistent storage drives 204. Other situations that may warrant destaging data from cache 218 may include disabling cache 218 of a specific volume, disabling write cache of a set of volumes, removing a computing node (i.e., server 206) from a storage system 110, resetting node software, and the like.

When the emergency detection module 602 detects an emergency situation, the disable module 604 may disable I/O throttling imposed by the throttling module 600. The disabling may occur with respect to all storage drives 204 or volumes on a storage system 110, or for certain storage drives 204 or volumes, depending on the storage drives 204 or volumes to which data needs to be destaged.

Once the disable module 604 disables I/O throttling, the destage module 606 may destage data from the cache 218 to the storage drives 204. At this point, the cache 218 may be operating on battery power and time may be of the essence. Because I/O throttling is disabled, the destage process may be benefited by increased I/O throughput, thereby increasing the probability that all modified data in the cache 218 may be destaged before the battery is depleted of energy. In certain embodiments, the I/O throughput between the cache 218 and the storage drives 204 is only limited by the performance characteristic of the devices themselves.

The remedy detection module 608 may detect when an emergency situation has been remedied and/or when all modified data in cache 218 has been destaged. When the remedy detection module 608 detects that the emergency situation has been remedied, the resume module 610 may resume I/O throttling.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for destaging data from cache, the method comprising:

maintaining, in cache, modified data to be destaged to persistent storage drives;

detecting an emergency situation wherein the modified data needs to be promptly destaged to the persistent storage drives;

automatically disabling, in response to the emergency situation, artificially-imposed throughput limits associated with the persistent storage drives; and destaging the modified data to the persistent storage drives.

2. The method of claim 1, wherein the emergency situation is a power outage.

3. The method of claim 1, wherein the emergency situation is a fault.

4. The method of claim 1, wherein the cache is battery-backed cache.

5. The method of claim 4, wherein destaging the modified data comprises destaging the modified data while the battery powers the cache.

6. The method of claim 1, further comprising re-enabling the artificially-imposed throughput limits when the emergency situation is remedied.

7. The method of claim 1, wherein detecting the emergency situation comprises receiving, from a battery manager, notice that the cache is operating on battery power.

8. A computer program product for destaging data from cache, the computer program product comprising a computer-readable storage medium having computer-usable program code embodied therein, the computer-usable program code configured to perform the following when executed by at least one processor:

maintain, in cache, modified data to be destaged to persistent storage drives;

detect an emergency situation wherein the modified data needs to be promptly destaged to the persistent storage drives;

automatically disable, in response to the emergency situation, artificially-imposed throughput limits associated with the persistent storage drives; and destage the modified data to the persistent storage drives.

9. The computer program product of claim 8, wherein the emergency situation is a power outage.

10. The computer program product of claim 8, wherein the emergency situation is a fault.

11. The computer program product of claim 8, wherein the cache is battery-backed cache.

12. The computer program product of claim 11, wherein destaging the modified data comprises destaging the modified data while the battery powers the cache.

13. The computer program product of claim 8, wherein the computer-usable program code is further configured to re-enable the artificially-imposed throughput limits when the emergency situation is remedied.

14. The computer program product of claim 8, wherein detecting the emergency situation comprises receiving, from a battery manager, notice that the cache is operating on battery power.

15. A system for destaging data from cache, the system comprising:

at least one processor;

at least one memory device operably coupled to the at least one processor and storing instructions for execution on the at least one processor, the instructions causing the at least one processor to:

maintain, in cache, modified data to be destaged to persistent storage drives;

detect an emergency situation wherein the modified data needs to be promptly destaged to the persistent storage drives;

automatically disable, in response to the emergency situation, artificially-imposed throughput limits associated with the persistent storage drives; and destage the modified data to the persistent storage drives.

16. The system of claim 15, wherein the emergency situation is a power outage.

17. The system of claim 15, wherein the emergency situation is a fault.

18. The system of claim 15, wherein the cache is battery-backed cache.

19. The system of claim 15, wherein destaging the modified data comprises destaging the modified data while the battery powers the cache.

20. The system of claim 15, wherein the instructions further cause the at least one processor to re-enable the artificially-imposed throughput limits when the emergency situation is remedied.

* * * * *